(12) United States Patent
Lee et al.

(10) Patent No.: US 10,055,044 B2
(45) Date of Patent: Aug. 21, 2018

(54) INTEGRAL SENSING APPARATUS FOR TOUCH AND PRESSURE SENSING AND METHOD FOR THE SAME

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 137 days.

(21) Appl. No.: 15/396,681

(22) Filed: Jan. 1, 2017

(65) Prior Publication Data
US 2017/0205929 A1 Jul. 20, 2017

(30) Foreign Application Priority Data
Jan. 18, 2016 (TW) .............................. 105101404 A

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01); *G06F 2203/04107* (2013.01)

(58) Field of Classification Search
CPC .................. G06F 3/0414; G06F 3/044; G06F 2203/04107
See application file for complete search history.

(56) References Cited

U.S. PATENT DOCUMENTS

2017/0068377 A1* 3/2017 Kim ...................... G06F 3/0416

\* cited by examiner

*Primary Examiner* — Larry Lee
(74) *Attorney, Agent, or Firm* — Chun-Ming Shih; HDLS IPR Services

(57) ABSTRACT

An integral sensing apparatus for touch and pressure includes an upper substrate having a first electrode layer with a plurality of first sensing electrodes, a second electrode layer having at least one second sensing electrode, a dielectric layer arranged between the first and the second electrode layers, and a capacitance sensing circuit. In touch sensing operation, the capacitance sensing circuit sends a first capacitance-exciting signal to a selected first sensing electrode and obtains a touch sensing signal from the selected first sensing electrode, wherein an auxiliary signal with same phase as the first capacitance-exciting signal is sent to at least one corresponding second sensing electrode. In pressure sensing operation, the capacitance sensing circuit sends a second capacitance-exciting signal to the corresponding second sensing electrode and obtains a pressure sensing signal from the second sensing electrode, wherein a counter exciting signal is also sent to the selected first sensing electrode.

20 Claims, 10 Drawing Sheets

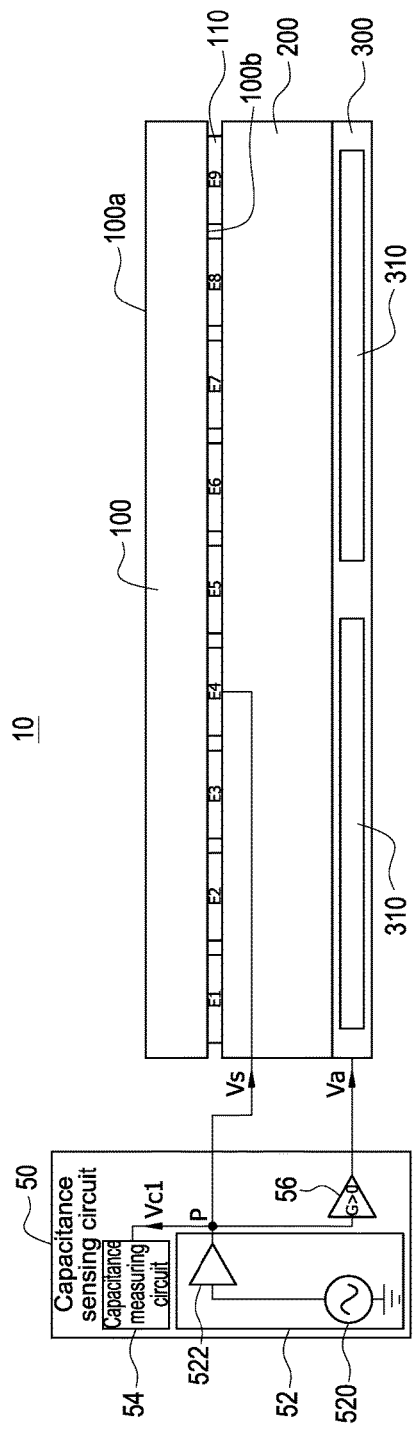
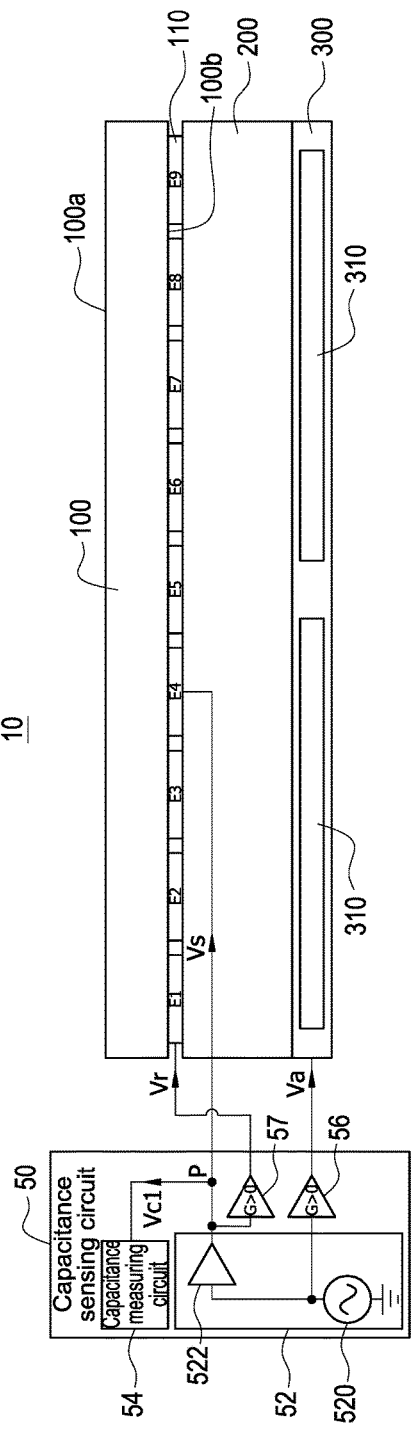
FIG.1A
FIG.1B

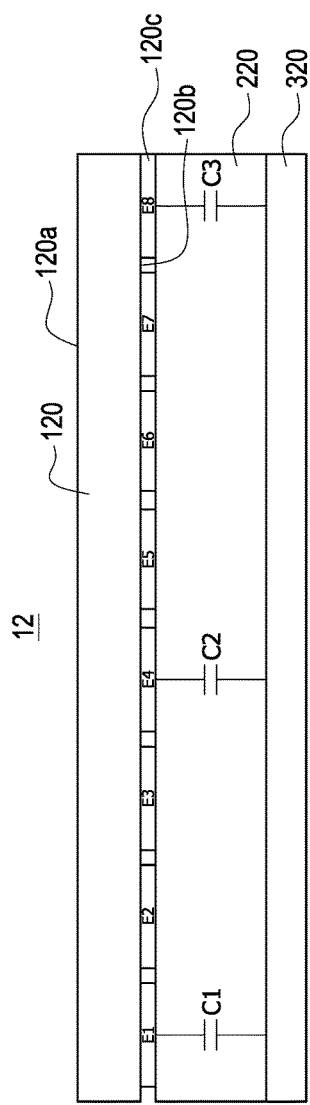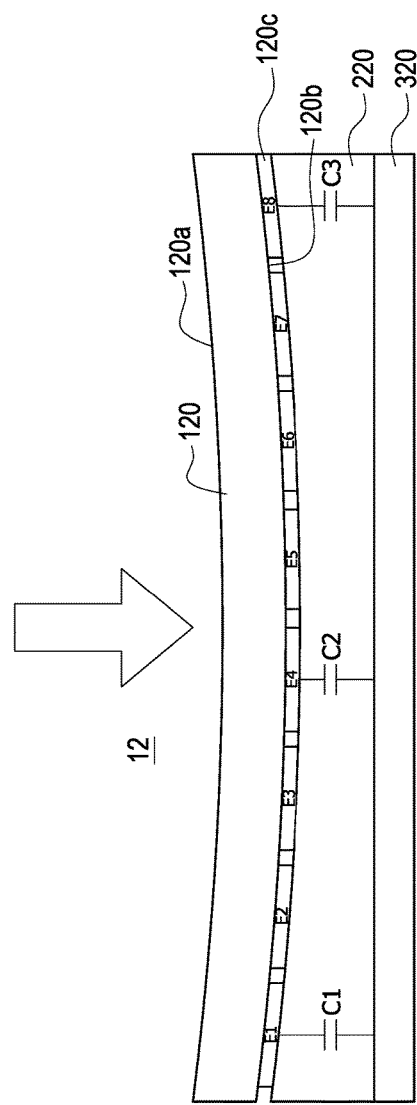

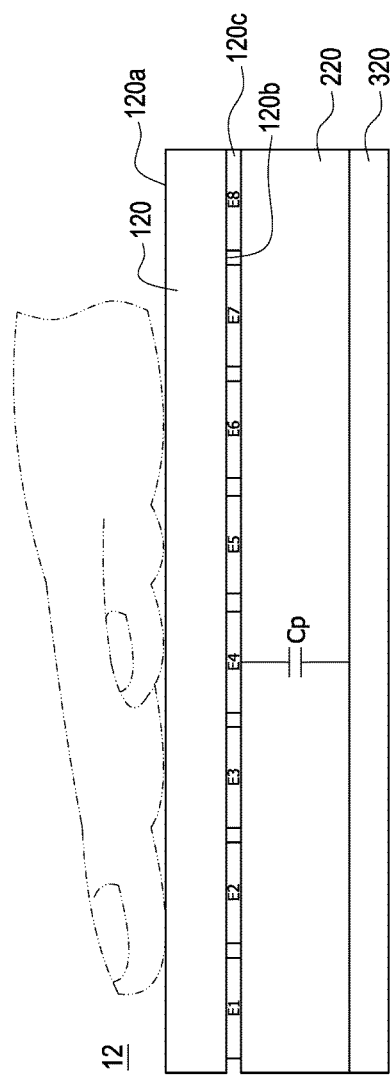
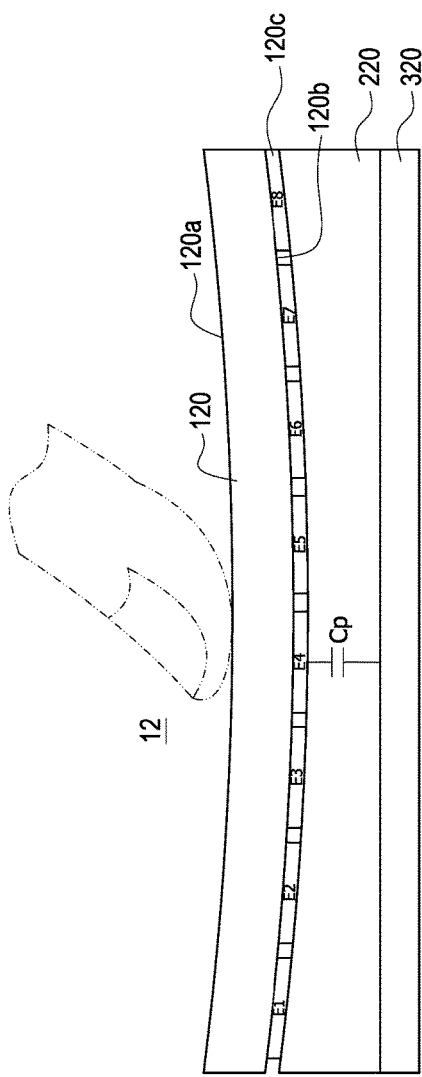
FIG.3A
FIG.3B

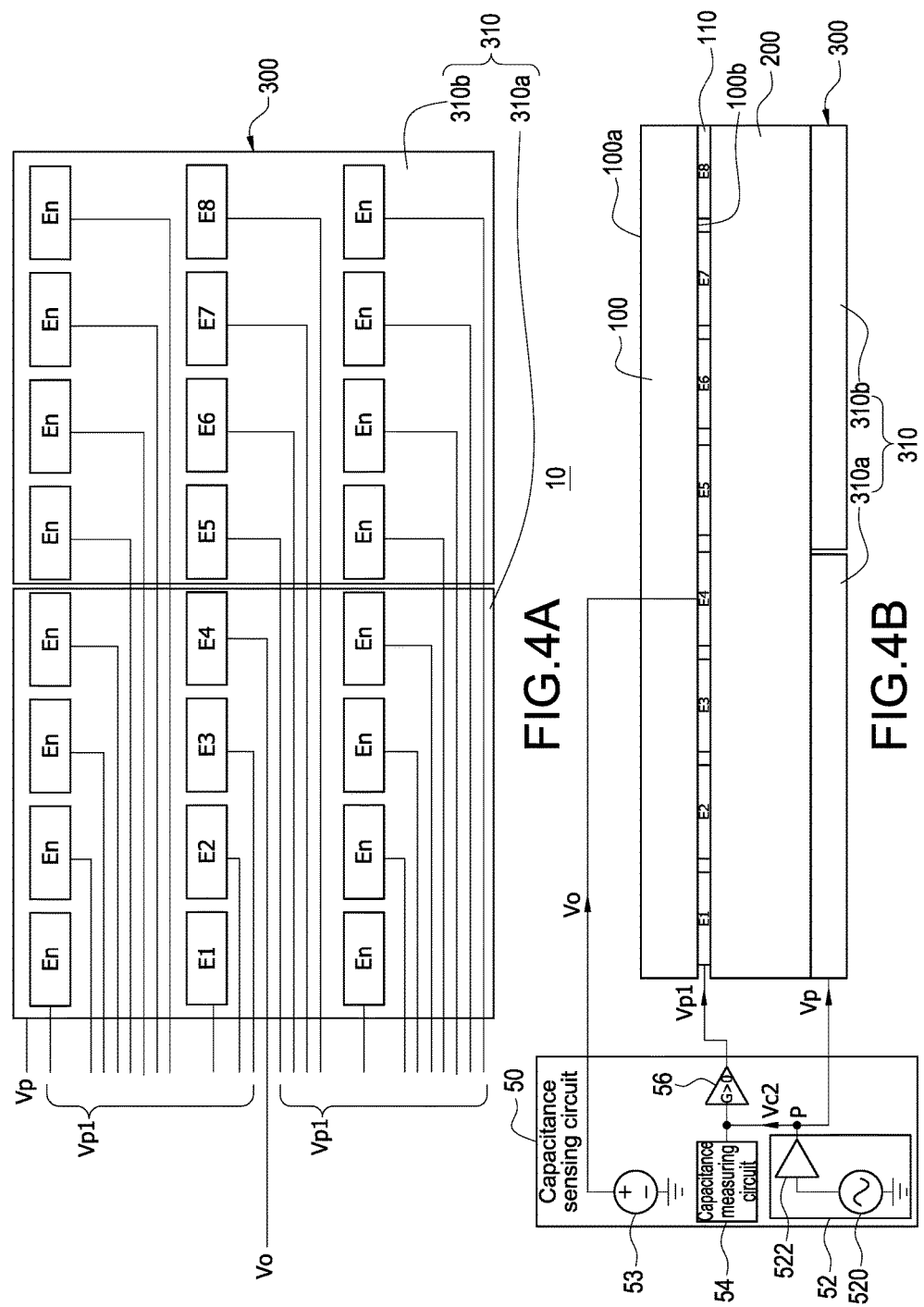

INTEGRAL SENSING APPARATUS FOR TOUCH AND PRESSURE SENSING AND METHOD FOR THE SAME

BACKGROUND OF THE INVENTION

Field of the Invention

The present invention relates to a sensor, especially to an integral sensing apparatus for touch and pressure sensing and method for the same.

Description of Prior Art

The touch display panels become popular as the market growing of the compact and lightweight mobile device. The pressure touch control technology has rapid development owing to the maturity of touch-control user interface and serious demand for 3D touch operation. The conventional pressure touch control panel generally integrates microelectromechanical sensor at edge or corner of the display panel to sense tactile pressure on the display panel. The cost of the sensor is high and the assembling of the sensor is difficult. It still needs lots of effort to improve the pressure touch control panel.

SUMMARY OF THE INVENTION

It is an object to provide an integral sensing apparatus and related method to overcome above-mentioned problems.

Accordingly, the present invention provides an integral sensing apparatus comprising: an upper substrate having a first face and a second face opposite to the first face; a first electrode layer arranged on the second face and having a plurality of first sensing electrodes; a second electrode layer having at least one second sensing electrode; a dielectric layer arranged between the first electrode layer and the second electrode layer; and a capacitance sensing circuit configured to sequentially or randomly send a first capacitance-exciting signal to a selected first sensing electrode and obtain a touch-sensing signal from the selected first sensing electrode, thus performing touch sensing operation, the capacitance sensing circuit further configured to send an auxiliary signal having the same phase as that of the first capacitance-exciting signal to the at least one second sensing electrode corresponding to the selected first sensing electrode; wherein the capacitance sensing circuit is configured to send a second capacitance-exciting signal to the at least one second sensing electrode and obtain a pressure sensing signal from the at least one second sensing electrode, thus performing pressure sensing operation, the capacitance sensing circuit is further configured to sequentially or randomly send a counter-exciting signal to the selected first sensing electrode in pressure sensing operation.

Accordingly, the present invention provides an integral method for sensing touch and pressure, comprising: providing an integral sensing apparatus comprising: an upper substrate having a first electrode layer on a face of the upper substrate and having a plurality of first sensing electrodes; a second electrode layer having at least one second sensing electrode, and a dielectric layer arranged between the first electrode layer and the second electrode layer, the dielectric layer being compressively deformed under pressure and restoring to original shape and volume if pressure is not present, and a capacitance sensing circuit; performing a touch sensing operation, wherein a first capacitance-exciting signal is sequentially sent to a selected first sensing electrode and a touch-sensing signal is obtained from the selected first sensing electrode thus performing touch sensing operation; and performing a pressure sensing operation, wherein a second capacitance-exciting signal is sent to the at least one second sensing electrode and obtain a pressure sensing signal from the at least one second sensing electrode, thus performing pressure sensing operation.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

FIG. 1A shows a schematic view of the integral sensing apparatus of the present invention.

FIG. 1B shows a schematic view of the integral sensing apparatus according to another embodiment of the present invention.

FIGS. 2A and 2B respectively shows sectional view for illustrating operation of a touch-pressure sensor.

FIGS. 3A and 3B respectively shows sectional view for illustrating another operation of the touch-pressure sensor.

FIGS. 4A and 4B show schematic views of the integral sensing apparatus according to the present invention.

DETAILED DESCRIPTION OF THE INVENTION

Figures 5A, 5B:
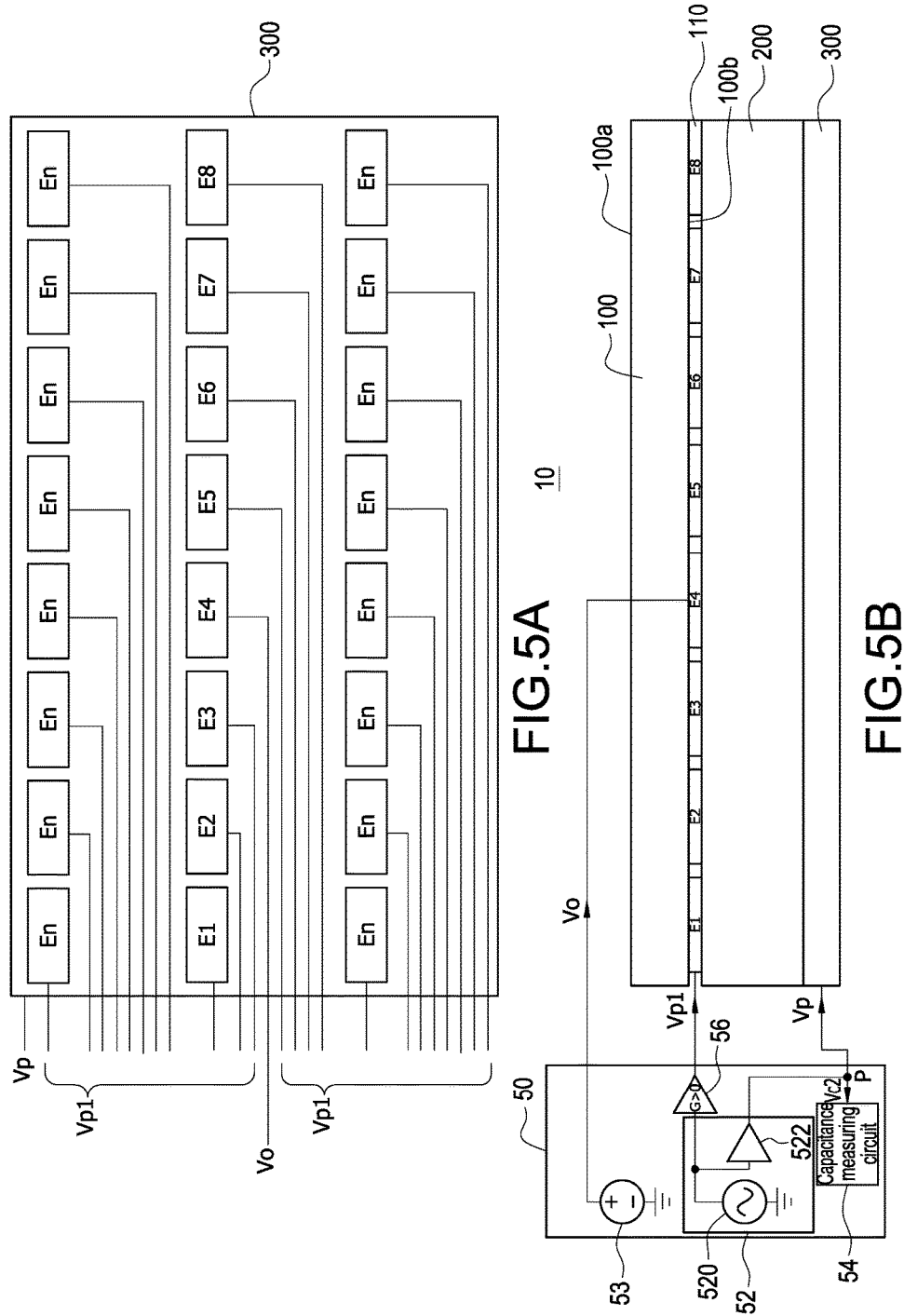
FIGS. 5A and 5B show schematic views of the integral sensing apparatus according to another embodiment of the present invention.

FIGS. 2A and 2B respectively shows sectional view for illustrating operation of a touch-pressure sensor 12. The touch-pressure sensor 12 comprises, from top to bottom, an upper substrate 120, a dielectric layer 220, and a second electrode layer 320, where the upper substrate 120 has a first face 120$a$, a second face 120$b$ and a first electrode layer 120C on the second face 120$b$. Moreover, the first electrode layer 120C comprises a plurality of first sensing electrodes E1~E8. As shown in FIG. 2A, the first electrode layer 120C and the second electrode layer 320 have uniform separation therebetween when no external force is exerted. At this time, the capacitor formed by each of the first sensing electrodes E1~E8 with respect to the underlying second electrode layer 320 has the identical capacitance. With reference now to FIG. 2B, when an external force is exerted on certain location of the touch-pressure sensor 12, for example the position corresponding to the first sensing electrode E4, the dielectric layer 220 is deformed there and the corresponding capacitance C2 is increased, thus facilitating the sensing of the pressure location.

FIGS. 3A and 3B respectively shows sectional view for illustrating another operation of the touch-pressure sensor 12, where FIG. 3A is corresponding to a lightly touching to a large area and FIG. 3B is corresponding to a heavily touching to a small area with single finger. When the touch-pressure sensor 12 is used for touch sensing, a capacitance sensing circuit (not shown) is used to sense a capacitance change between the touching point of user finger and the first sensing electrodes E1~E8, thus identifying the touching location of finger or palm and fulfilling touch-control function. However, as shown in FIGS. 3B, the capacitance may also have change for non-touching location if the touch-pressure sensor 12 is warped (deformed) such that the separation between the first sensing electrodes E1~E8 and the underlying second electrode layer 320 is also changed. As can be seen in FIG. 3B, the first sensing electrodes E3 and E5 near the first sensing electrode E4, which is corresponding to the actual touch location, have capacitance change if the touch-pressure sensor 12 is substantially warped. The capacitance sensing circuit may not differentiate the operations shown in FIGS. 3A and 3B because the first sensing electrodes E3 and E5 in FIG. 3A also have capacitance change due to a large area touching by palm.

To overcome the problems mentioned above, the present invention provides an integral sensing apparatus for touch and pressure sensing. The embodiments of the present invention will be described with reference to following drawings.

FIG. 1A shows a schematic view of the integral sensing apparatus for touch and pressure sensing (hereinafter integral sensing apparatus) 10 of the present invention. The integral sensing apparatus 10 comprises, from top to bottom, an upper substrate 100, a dielectric layer 200, and a second electrode layer 300, where the upper substrate 100 has a first face 100a, a second face 100b and a first electrode layer 110 on the second face 100b. Moreover, the first electrode layer 110 comprises a plurality of first sensing electrodes such as the first sensing electrodes E1~E9 shown in FIG. 1A. However, the embodiment shown in FIG. 1A is used only for demonstration and the number and arrangement of the first sensing electrodes can be changed. The integral sensing apparatus 10 further comprises a capacitance sensing circuit 50, and the capacitance sensing circuit 50 comprises a capacitance-excitation driving circuit 52 and a capacitance measuring circuit 54.

With reference again to FIG. 1A, the integral sensing apparatus 10 is operated for touch control sensing. The capacitance-excitation driving circuit 52 comprises a signal source 520 and a driving unit 522 and sequentially or randomly applies a first capacitance-exciting (stimulus signal) Vs for touch-control sensing to a selected first sensing electrode (for example, the first sensing electrode E4 is the selected first sensing electrode in FIG. 1A). The capacitance-excitation driving circuit 52 further sends the first capacitance-exciting signal Vs to a non-inverting amplifier 56, where the gain of the non-inverting amplifier 56 is preferably one to generate an auxiliary signal Va having the same phase as that of the first capacitance-exciting signal Vs. The auxiliary signal Va is applied to at least one corresponding second sensing electrode 310. By applying a signal with the same phase as the first capacitance-exciting signal Vs on the corresponding second sensing electrode 310, effectively there is minute (or even no) voltage difference between the selected first sensing electrode E4 and the corresponding second sensing electrode 310. Therefore, there is minute (or even no) capacitance between the selected first sensing electrode E4 and the corresponding second sensing electrode 310. The influence to capacitance measurement due to warp of the dielectric layer 200 can be prevented when sensing a touch operation for the selected first sensing electrode E4. Moreover, the influence to capacitance measurement due to parallel capacitance from the corresponding second sensing electrode 310 and the ground point can also be prevented.

Figure 7:
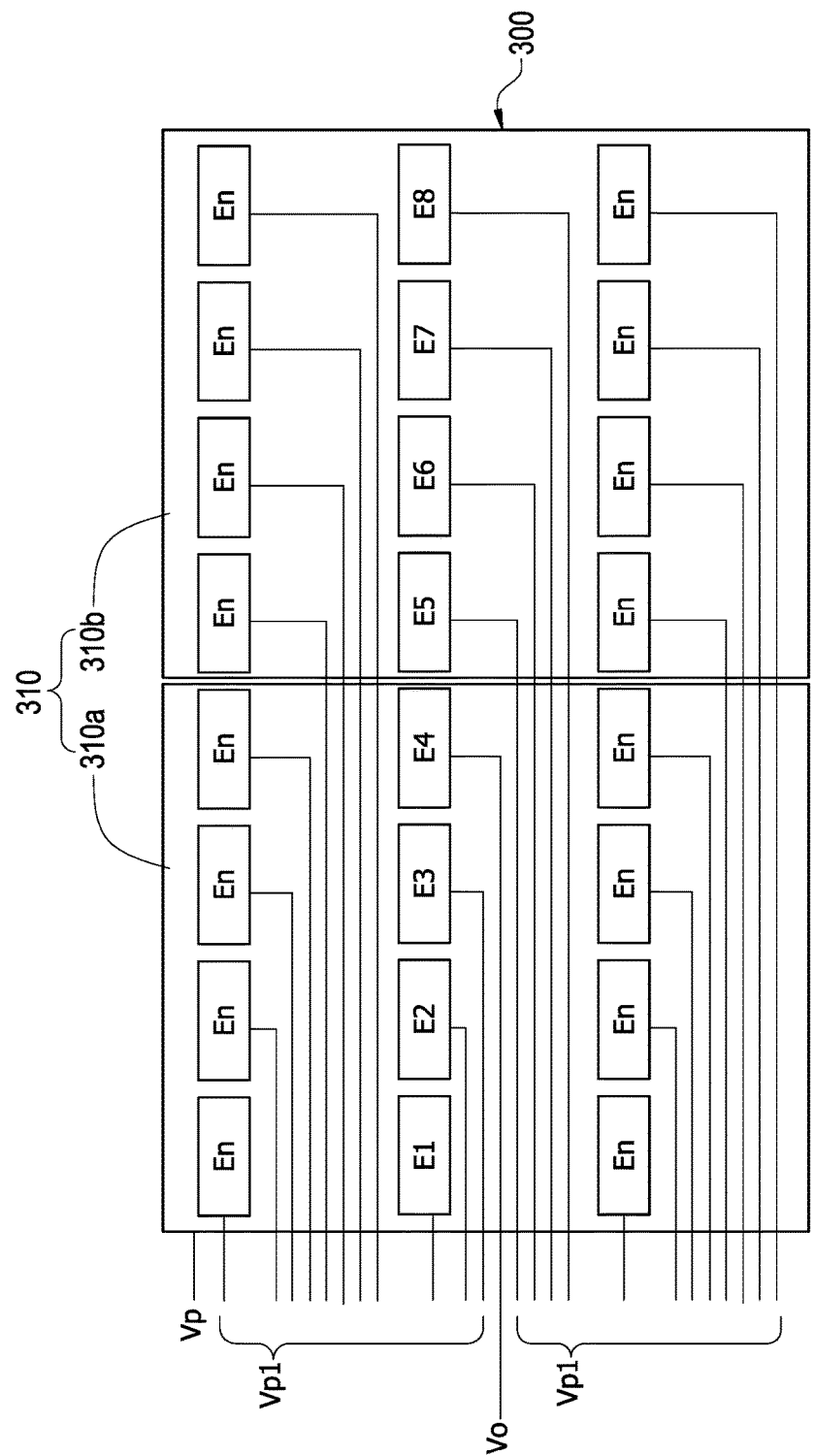
FIG. 7 shows a partial top view of the integral sensing apparatus according to an embodiment of the present invention.

FIG. 7 shows a partial top view of the integral sensing apparatus 10 according to an embodiment of the present invention, which mainly shows the arrangement of the first sensing electrodes E1~E8, En and the second sensing electrodes 310a, 310b. As shown in this figure, the second electrode layer 300 comprises two second sensing electrodes 310a, 310b and each of the first sensing electrodes E1~E8 is corresponding to at least one of the second sensing electrodes 310a, 310b. The "correspondence" means each of the first sensing electrodes E1~E8 is at least overlapped with one corresponding second sensing electrode 310a or 310b from projected view, or near the one corresponding second sensing electrode 310a or 310b from projected view, thus avoiding the influence due to warp of the dielectric layer 200. For example, the corresponding second sensing electrode for the selected first sensing electrode E4 is the second sensing electrode 310a as shown in FIG. 7. One first sensing electrode may have plurality of corresponding second sensing electrodes if the area of the first sensing electrode is larger than the area of the second sensing electrode. The above mentioned example is only for exemplary purpose and not for limitation of the present invention.

By the integral sensing apparatus 10 of the present invention shown in FIG. 1A, the measurement influence due to the warp or deformation of the dielectric layer 200 can be alleviated or prevented with the auxiliary signal Va. After the capacitance-excitation driving circuit 52 of the capacitance sensing circuit 50 sends the first capacitance-exciting signal Vs for touch-control sensing to the selected first sensing electrode E4, the capacitance measuring circuit 54 senses the touch-sensing signal Vc1 at the sensing point P to precisely determine the touch control location.

FIG. 1B shows a schematic view of the integral sensing apparatus 10 according to another embodiment of the present invention, which is also used for touch control sensing. The integral sensing apparatus 10 is similar to that shown in FIG. 1A except that the integral sensing apparatus 10 shown in FIG. 1B further comprises another non-inverting amplifier 57 able to generate a reflection signal Vr having the same phase as the first capacitance-exciting signal Vs. The reflection signal Vr is applied to at least a part of the first sensing electrodes beside the selected first sensing electrode E4. The integral sensing apparatus 10 shown in FIG. 1B also employs the auxiliary signal Va to alleviate or prevent the measurement influence due to the warp or deformation of the dielectric layer 200. Moreover, the reflection signal Vr is applied to concentrate the electric lines to the selected first sensing electrode E4 to enhance measurement accuracy. After the capacitance-excitation driving circuit 52 of the capacitance sensing circuit 50 sends the first capacitance-exciting signal Vs for touch-control sensing to the selected first sensing electrode E4, the capacitance measuring circuit 54 senses the touch-sensing signal Vc1 at the sensing point P to precisely determine the touch control location.

FIGS. 4A and 4B show schematic views of the integral sensing apparatus 10 according to the present invention, which are used for pressure sensing. The operations shown in FIGS. 4A and 4B can follow the touch control sensing operation in FIG. 1A. After performing the touch control sensing operation for the selected first sensing electrode E4, the integral sensing apparatus 10 performs pressure sensing for the second sensing electrode 310a corresponding to the selected first sensing electrode E4, or performs pressure sensing for all of the second sensing electrodes. With reference again to FIG. 7, the second sensing electrode corresponding to the selected first sensing electrode E4 is the second sensing electrode 310a, and therefore as shown in FIG. 4B, the integral sensing apparatus 10 sends a second capacitance-exciting signal Vp for pressure sensing to the second sensing electrode 310a. The capacitance sensing circuit 50 further comprises a non-inverting amplifier 56, where the gain of the non-inverting amplifier 56 is preferably one to generate a shielding signal Vp1 having the same phase as that of the second capacitance-exciting signal Vp. The shielding signal Vp1 is applied to the non-chosen (non-selected) first sensing electrodes, namely, the first sensing electrodes E1~E3, E5~E8 and En. In other word, the shielding signal Vp1 is at applied to at least part of the first sensing electrodes other than the selected first sensing electrode E4. The capacitance sensing circuit 50 of the integral sensing apparatus 10 has a DC reference voltage source 53, which generates a counter-exciting signal Vo and applies (sequentially or randomly) the counter-exciting signal Vo to the selected first sensing electrodes E4.

FIG. 4A shows a partial top view of the integral sensing apparatus 10 according to the present invention. This drawing mainly shows the arrangement of the first sensing electrodes E1~E8, En and the second sensing electrodes 310a, 310b as well as the application manner of the second capacitance-exciting signal Vp, the shielding signal Vp1 and the counter-exciting signal Vo. With reference again to FIG. 4B, in pressure sensing operation, the shielding signal Vp1, which has the same phase as that of the second capacitance-exciting signal Vp, is applied to the non-selected first sensing electrodes (namely, the first sensing electrodes other than the selected first sensing electrode E4) to shield the influence from user finger and enhance the measurement accuracy. Moreover, the counter-exciting signal Vo with a predetermined voltage level is applied to the selected first sensing electrode E4 to enhance the pressure measurement accuracy for the second sensing electrode. The capacitance measuring circuit 54 senses the pressure-sensing signal Vc2 (from the second sensing electrode, for example, the second sensing electrode 310a) at the sensing point P to precisely determine whether a pressing action is present and the amount of pressure.

FIGS. 5A and 5B and 5C show the integral sensing apparatus 10 according to still another embodiment of the present invention. The embodiment shown in FIGS. 5A and 5B is similar to that shown in FIGS. 4A~4B. However, in the embodiment shown in FIGS. 5A and 5B, the input of the non-inverting amplifier 56 (used for generating the shielding signal Vp1) is not connected to the sensing point P of the capacitance measuring circuit 54. For example, the input of the non-inverting amplifier 56 may be directly connected to the signal source 520 to prevent from influencing by the pressure-sensing signal Vc2 at the sensing point P of the capacitance measuring circuit 54.

Figure 6A:
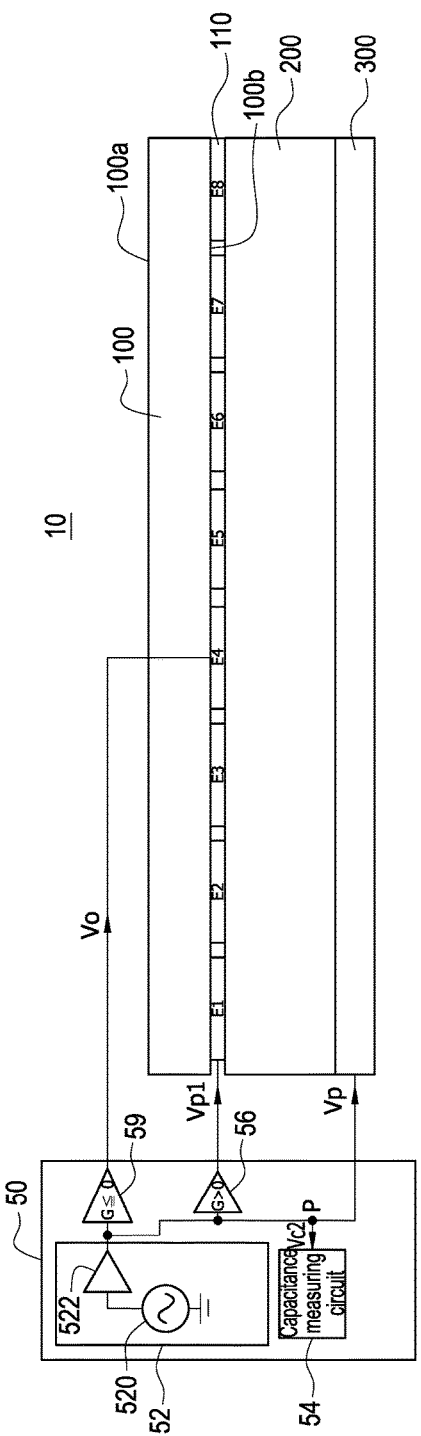
FIG. 6A shows a schematic view of the integral sensing apparatus according to still another embodiment of the present invention.

FIG. 6A shows a schematic view of the integral sensing apparatus 10 according to still another embodiment of the present invention. The embodiment shown in FIG. 6A is similar to that shown in FIG. 5B except that the capacitance sensing circuit 50 has an inverting amplifier 59 to replace the DC reference voltage source 53. In other word, the integral sensing apparatus 10 uses the inverting amplifier 59 to generate a time-varying signal with phase opposite to that of the second capacitance-exciting signal Vp to function as the counter-exciting signal Vo. Similarly, the pressure sensing accuracy for the second sensing electrode can also be enhanced.

Figure 6B:
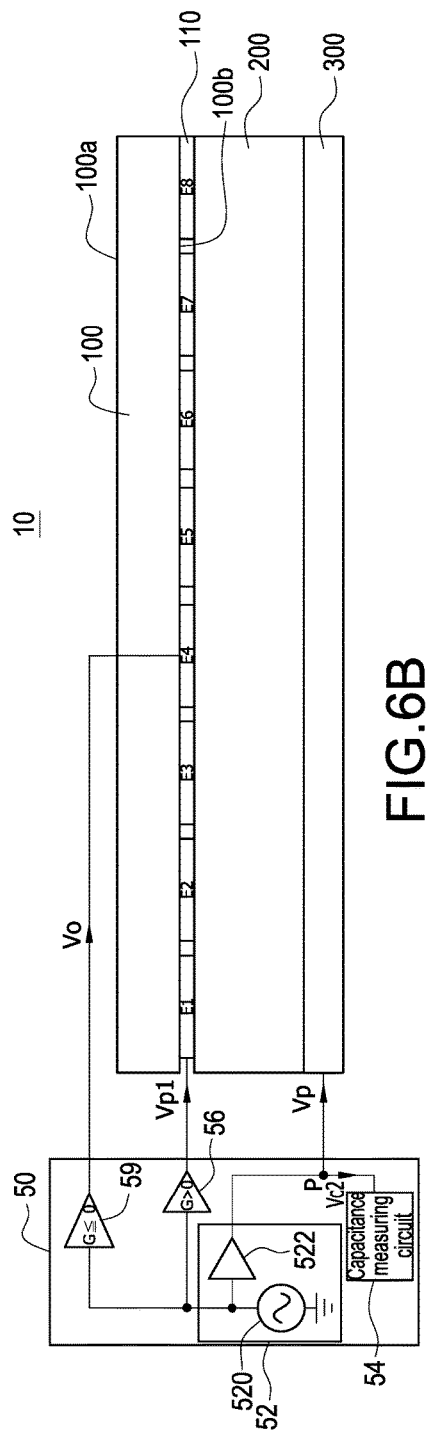
FIG. 6B shows a schematic view of the integral sensing apparatus according to still another embodiment of the present invention.

FIG. 6B shows a schematic view of the integral sensing apparatus 10 according to still another embodiment of the present invention. The embodiment shown in FIG. 6B is similar to that shown in FIG. 5B except that the capacitance sensing circuit 50 has an inverting amplifier 59 to replace the DC reference voltage source 53. In other word, the integral sensing apparatus 10 uses the inverting amplifier 59 to generate a time-varying signal with phase opposite to that of the second capacitance-exciting signal Vp to function as the counter-exciting signal Vo. Similarly, the pressure sensing accuracy for the second sensing electrode can also be enhanced. Besides, the input of the non-inverting amplifier 56 (used for generating the shielding signal Vp1) is not connected to the sensing point P of the capacitance measuring circuit 54. For example, the input of the non-inverting amplifier 56 may be directly connected to the signal source 520 to prevent from influencing by the pressure-sensing signal Vc2 at the sensing point P of the capacitance measuring circuit 54.

Figure 8A:
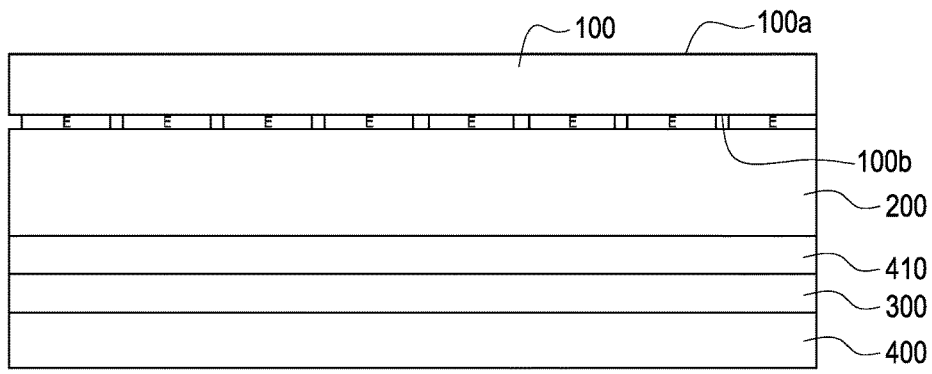
FIGS. 8A~8C are schematic views of the integral sensing apparatus according to other embodiments of the present invention.
Figure 8B:
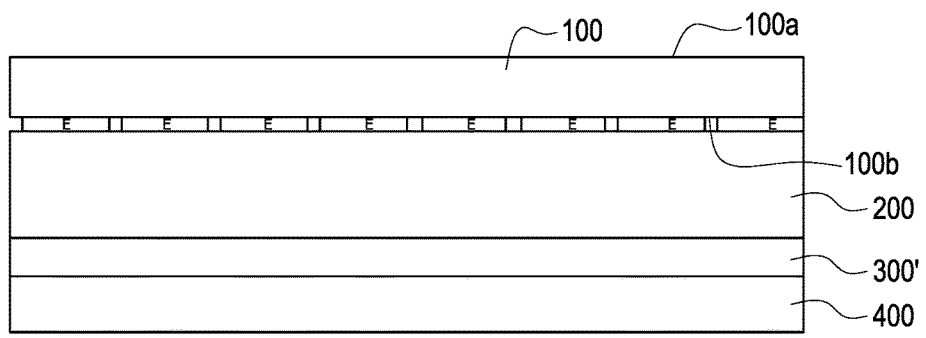
Figure 8C:
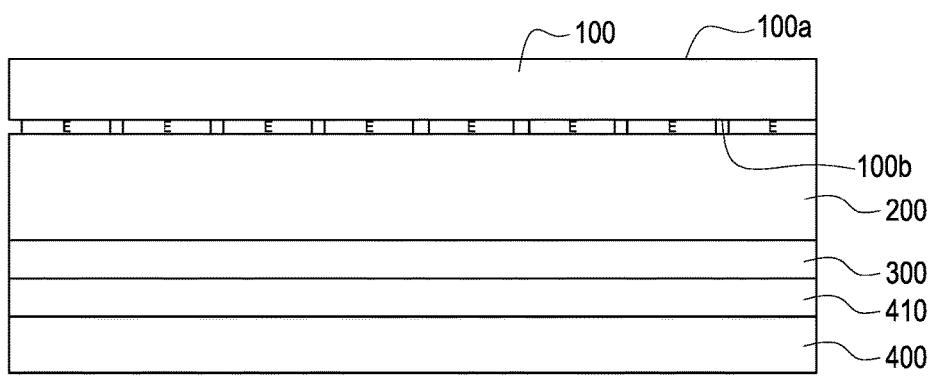

FIGS. 8A~8C are schematic views of the integral sensing apparatus 10 according to other embodiments of the present invention. With reference to FIG. 8A, the integral sensing apparatus 10 further comprises a polarizer layer 410 and a lower substrate 400. The polarizer layer 410 is placed between the dielectric layer 200 and the second electrode layer 300. The lower substrate 400 is placed on a side of the second electrode layer 300, which is opposite to the dielectric layer 200. With reference to FIG. 8B, in this embodiment, the integral sensing apparatus 10 further comprises a lower substrate 400 and the second electrode layer is a second electrode layer 300' with polarizer function. Similarly, the lower substrate 400 is placed on a side of the second electrode layer 300', which is opposite to the dielectric layer 200. The integral sensing apparatus 10 shown in FIG. 8C is similar to that shown in FIG. 8A except that the polarizer layer 410 is placed between the second electrode layer 300 and the lower substrate 400. In the embodiments shown in FIG. 8A~8C, the lower substrate 400 may be a glass substrate, a polymer substrate, or a color filter of a display panel; the upper substrate 100 may be a glass substrate, a polymer substrate, or just a hard coating layer.

In above mentioned embodiments, the dielectric layer 200 comprises an elastic gel material, where the elastic gel material is compressively deformed under pressure and restores to the original shape and volume if the pressure is not present. The elastic gel material is for example, but not limited to, polydimethylsiloxane (PDMS). The first capacitance-exciting signal (the stimulus signal) Vs and the second capacitance-exciting signal Vp may be a time-varying signal such as a sinusoidal wave signal, a square wave signal, a triangular wave signal or a trapezoidal wave signal. The first capacitance-exciting signal Vs and the second capacitance-exciting signal Vp may also be a current source. The counter-exciting signal Vo may be a DC reference signal or a time-varying signal with phase opposite to that of the second capacitance-exciting signal Vp.

Figure 9:
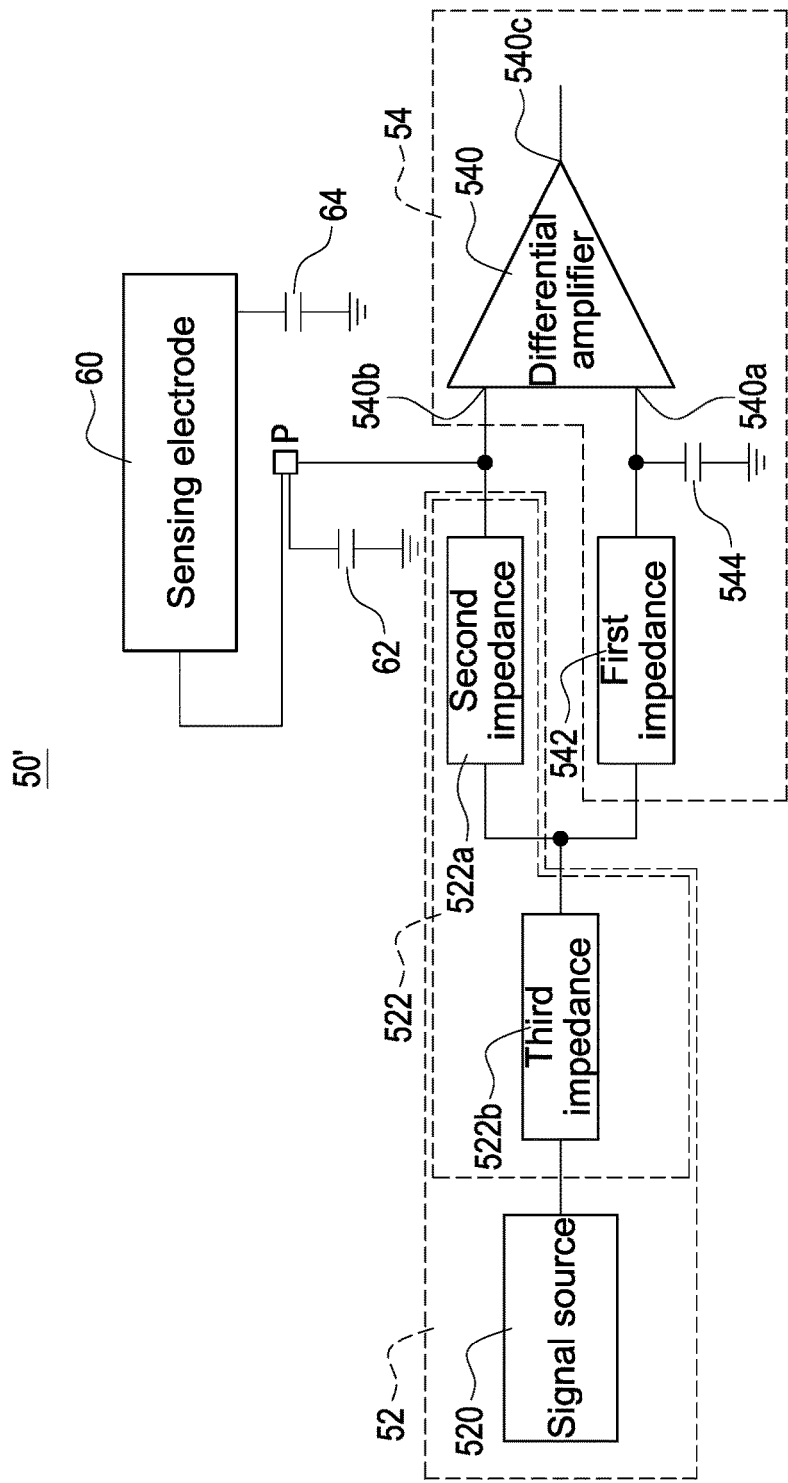
FIG. 9 shows the circuit diagram of the self-capacitance sensing circuit according to an embodiment of the present invention.

FIG. 9 shows the circuit diagram of the self-capacitance sensing circuit 50' according to an embodiment of the present invention. The self-capacitance sensing circuit 50' mainly comprises a capacitance-excitation driving circuit 52 and a capacitance measuring circuit 54 to sense a capacitance change at the sensing point P. The capacitance-excitation driving circuit 52 comprises a signal source 520 and a driving unit 522 (including a second impedance 522a and a third impedance 522b). The capacitance measuring circuit 54 comprises a differential amplifier 540, a first impedance 542 and a first capacitor 544 and is used to sense a capacitance change at a sensing electrode 60, where the sensing electrode 60 comprises a first stray capacitance 62 and a second stray capacitance 64.

The signal source 520 is electrically coupled with the first impedance 542 and the second impedance 522a. The first impedance 542 is electrically coupled with the first capacitor 544 and the first capacitor 544 is electrically coupled with the first input end 540a of the differential amplifier 540. The second impedance 522a is electrically coupled with the second input end 540b of the differential amplifier 540. The sensing electrode 60 is electrically coupled to the second impedance 522a and the second input end 540b through a node (such as an IC pin) of the self-capacitance sensing circuit 50'. The first stray capacitance 62 is electrically coupled to the node and the second stray capacitance 64 is electrically coupled to the sensing electrode 60.

In the self-capacitance sensing circuit 50' shown in FIG. 9, the sensing electrode 60 receives a touch signal when a finger or a conductor is touched thereon. The signal source 520 is a periodical signal and sent to the third impedance 522, while the resistance values of the first impedance 542 and the second impedance 522a are identical. The differential amplifier 540 will generate a differential touch signal after receiving the signal source 520 and the touch signal from the sensing electrode 60. In this embodiment, the capacitance of the first capacitor 544 is equal to the resulting capacitance of the first stray capacitance 62 in parallel connection with the second stray capacitance 64. The capacitance of the second stray capacitance 64 changes when user finger approaches or touches the sensing electrode 60. Therefore, the voltages fed to the first input end 540a and the second input end 540b will be different such that the differential amplifier 540 has a (non-zero) differential output at the output end 540c. In this way, the minute capacitance change on the sensing electrode 60 can be detected by the differential amplifier 540. Moreover, the noise from circuits or power source can be advantageously removed. The detail of the self-capacitance sensing circuit 50' can be referred to U.S. Pat. No. 8,704,539 (corresponding to Taiwan patent No. I473001) filed by the same applicant.

Figure 10:
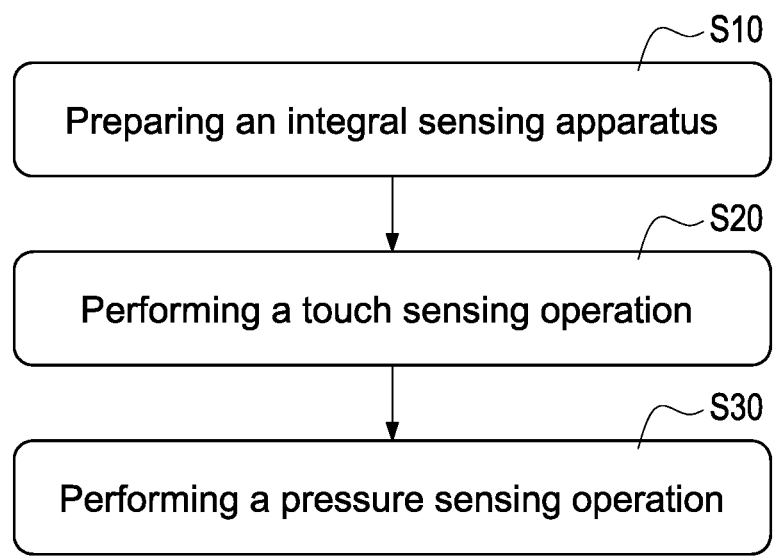
FIG. 10 shows a flowchart of an integral sensing method according to an embodiment of the present invention.

FIG. 10 shows a flowchart of an integral capacitive touch and pressure sensing method according to an embodiment of the present invention. In step S10, the method provides an integral sensing apparatus, which comprises an upper substrate having a first face arranged with a first electrode layer having a plurality of first sensing electrodes; a second electrode layer having at least one second sensing electrode; a dielectric layer arranged between the first and the second electrode layers, the dielectric layer being compressively deformed under pressure and restoring to original shape and volume if the pressure is not present; and a capacitance sensing circuit (for example, the self-capacitance sensing circuit 50' shown in FIG. 9). The step S20 performs a touch control sensing step, the integral sensing apparatus sends a first capacitance-exciting signal to the selected first sensing electrode and obtains (reads) a touch-sensing signal from the selected first sensing electrode for touch control sensing. The step S30 performs a pressure sensing step, the integral sensing apparatus sends a second capacitance-exciting signal to at least one second sensing electrode (for example, the second sensing electrode corresponding to the selected first sensing electrode) and obtains (reads) a pressure-sensing signal from the second sensing electrode for pressure sensing.

In step S20, the integral sensing apparatus may optionally detect whether a touch event is sensed and performs the Step 30 if the touch event is sensed. In above step S20, an auxiliary signal having the same phase as that of the first capacitance-exciting signal may be optionally applied to the at least one second sensing electrode. Moreover, in the step S20, a reflection signal having the same phase as the first capacitance-exciting signal may be optionally applied to the first sensing electrodes near the selected first sensing electrode. In the step S30, a counter-exciting signal may be optionally sent to the selected first sensing electrode. The counter-exciting signal is a DC reference voltage (such as a ground signal of zero volt) or a time-varying signal with phase opposite to that of the second capacitance-exciting signal. Moreover, in step S30, a signal (shielding signal) with phase same with the second capacitance-exciting signal may be optionally applied to at least one of non-selected first sensing electrodes.

In above-motioned sensing operation, the first or the second capacitance-exciting signal may be a time-varying signal such as a sinusoidal wave signal, a square wave signal, a triangular wave signal or a trapezoidal wave signal. The first or the second capacitance-exciting signal may also be a current source.

Thus, particular embodiments have been described. Other embodiments are within the scope of the following claims. For example, the actions recited in the claims may be performed in a different order and still achieve desirable results.

What is claimed is:

1. An integral sensing apparatus comprising:
    an upper substrate having a first face and a second face opposite to the first face;
    a first electrode layer arranged on the second face and having a plurality of first sensing electrodes;
    a second electrode layer having at least one second sensing electrode;
    a dielectric layer arranged between the first electrode layer and the second electrode layer; and
    a capacitance sensing circuit configured to sequentially or randomly send a first capacitance-exciting signal to a selected first sensing electrode and obtain a touch-sensing signal from the selected first sensing electrode, thus performing touch sensing operation, the capacitance sensing circuit further configured to send an auxiliary signal having the same phase as that of the first capacitance-exciting signal to the at least one second sensing electrode corresponding to the selected first sensing electrode;
    wherein the capacitance sensing circuit is configured to send a second capacitance-exciting signal to the at least one second sensing electrode and obtain a pressure sensing signal from the at least one second sensing electrode, thus performing pressure sensing operation, the capacitance sensing circuit is further configured to sequentially or randomly send a counter-exciting signal to the selected first sensing electrode in pressure sensing operation.

2. The integral sensing apparatus in claim 1, wherein the capacitance sensing circuit is a self-capacitance sensing circuit.

3. The integral sensing apparatus in claim 1, wherein the dielectric layer comprises an elastic gel material, where the elastic gel material is compressively deformed under pressure and restores to original shape and volume if pressure is not present.

4. The integral sensing apparatus in claim 1, wherein the capacitance sensing circuit is further configure to send a reflection signal having the same phase as the first capacitance-exciting signal to the first sensing electrodes near the selected first sensing electrode in touch sensing operation.

5. The integral sensing apparatus in claim 1, wherein the capacitance sensing circuit is further configure to send a shielding signal having the same phase as the second capacitance-exciting signal to the non-selected first sensing electrodes.

6. The integral sensing apparatus in claim 1, wherein the first or the second capacitance-exciting signal is a time-varying signal or a current source.

7. The integral sensing apparatus in claim 6, wherein the counter-exciting signal is a DC reference voltage or a time-varying signal with phase opposite to that of the second capacitance-exciting signal.

8. The integral sensing apparatus in claim 7, wherein the DC reference voltage is a ground voltage of zero volt.

9. The integral sensing apparatus in claim 1, wherein the upper substrate is a glass substrate, a polymer substrate, or a hard coating layer.

10. The integral sensing apparatus in claim 1, further comprising a lower substrate arranged toward a side of the second electrode layer opposite to the dielectric layer, the lower substrate is a glass substrate or a polymer substrate.

11. The integral sensing apparatus in claim 10, wherein the lower substrate is a color filter of a display panel.

12. An integral method for sensing touch and pressure, comprising:
providing an integral sensing apparatus comprising: an upper substrate having a first electrode layer on a face of the upper substrate and having a plurality of first sensing electrodes; a second electrode layer having at least one second sensing electrode, and a dielectric layer arranged between the first electrode layer and the second electrode layer, the dielectric layer being compressively deformed under pressure and restoring to original shape and volume if pressure is not present, and a capacitance sensing circuit;
performing a touch sensing operation, wherein a first capacitance-exciting signal is sequentially sent to a selected first sensing electrode and a touch-sensing signal is obtained from the selected first sensing electrode;
performing a pressure sensing operation, wherein a second capacitance-exciting signal is sent to the at least one second sensing electrode and obtaining a pressure sensing signal from the at least one second sensing electrode; and
determining whether a touch event is confirmed after the touch sensing operation is finished and performing the pressure sensing operation if the touch event is confirmed.

13. The method in claim 12, wherein the first or the second capacitance-exciting signal is a time-varying signal.

14. The method in claim 13, further comprising: sending an auxiliary signal having the same phase as that of the first capacitance-exciting signal to the at least one second sensing electrode in touch sensing operation.

15. The method in claim 14, further comprising: sending a reflection signal having the same phase as the first capacitance-exciting signal to the first sensing electrodes near the selected first sensing electrode in touch sensing operation.

16. The method in claim 13, further comprising: sending a counter-exciting signal to the selected first sensing electrode in pressure sensing operation.

17. The method in claim 16, wherein the counter-exciting signal is a DC reference voltage or a time-varying signal with phase opposite to that of the second capacitance-exciting signal.

18. The method in claim 17, wherein the DC reference voltage is a ground voltage of zero volt.

19. The method in claim 16, further comprising: sending a signal having the same phase as the second capacitance-exciting signal to the non-selected first sensing electrodes in pressure sensing operation.

20. The method in claim 12, wherein the capacitance sensing circuit is a self-capacitance sensing circuit.

\* \* \* \* \*